United States Patent
Drabek

(10) Patent No.: US 8,082,815 B2
(45) Date of Patent: Dec. 27, 2011

(54) HYDRAULICALLY ACTUATED SHIFT ACTUATOR ASSEMBLY

(75) Inventor: Michael Drabek, Brandenburg (DE)

(73) Assignee: ZF Friedrichshafen AG, Friedrichshafen (DE)

(*) Notice: Subject to any disclaimer, the term of this patent is extended or adjusted under 35 U.S.C. 154(b) by 461 days.

(21) Appl. No.: 12/307,415

(22) PCT Filed: Jun. 29, 2007

(86) PCT No.: PCT/EP2007/056541
§ 371 (c)(1),
(2), (4) Date: Jan. 14, 2009

(87) PCT Pub. No.: WO2008/003647
PCT Pub. Date: Jan. 10, 2008

(65) Prior Publication Data
US 2009/0301242 A1 Dec. 10, 2009

(30) Foreign Application Priority Data
Jul. 6, 2006 (DE) .......................... 10 2006 031 265

(51) Int. Cl.
*F16H 59/00* (2006.01)
(52) U.S. Cl. .......................................................... 74/335
(58) Field of Classification Search .................. 74/335, 74/346, 606 R
See application file for complete search history.

(56) References Cited

U.S. PATENT DOCUMENTS

| 3,589,483 | A | * | 6/1971 | Smith | 192/3.52 |
|---|---|---|---|---|---|
| 4,719,812 | A | * | 1/1988 | Machida et al. | 74/335 |
| 4,722,237 | A | | 2/1988 | McNinch, Jr. | |
| 5,009,125 | A | * | 4/1991 | Machida et al. | 74/606 R |
| 6,607,462 | B2 | * | 8/2003 | Thoma et al. | 475/198 |
| 6,854,353 | B2 | * | 2/2005 | Koerber | 74/473.11 |
| 7,127,961 | B2 | | 10/2006 | Bradford et al. | |
| 7,942,252 | B2 | * | 5/2011 | Schnitzer | 192/3.58 |
| 2006/0005647 | A1 | | 1/2006 | Bradford et al. | |
| 2008/0210031 | A1 | * | 9/2008 | Uberti et al. | 74/335 |

FOREIGN PATENT DOCUMENTS

| DE | 2029338 | 5/1971 |
|---|---|---|
| EP | 0085498 | 8/1983 |
| EP | 0487861 | 6/1992 |
| FR | 2798179 | 3/2001 |
| GB | 2179712 | 3/1987 |

* cited by examiner

*Primary Examiner* — Roger Pang
(74) *Attorney, Agent, or Firm* — Davis & Bujold, P.L.L.C.

(57) ABSTRACT

An arrangement of a hydraulically actuated shift actuator including a shift cylinder (3), arranged outside the hydraulic control unit of a transmission. The shift cylinder (3) of the shift actuator is fixed on a flat or circular machined area (2) on the inside of a housing (1). The side of the housing (1) facing away from the shift cylinder (3) has a flat surface (4) on which the hydraulic control unit (5) is fixed in a hydraulically leak-proof manner.

4 Claims, 1 Drawing Sheet

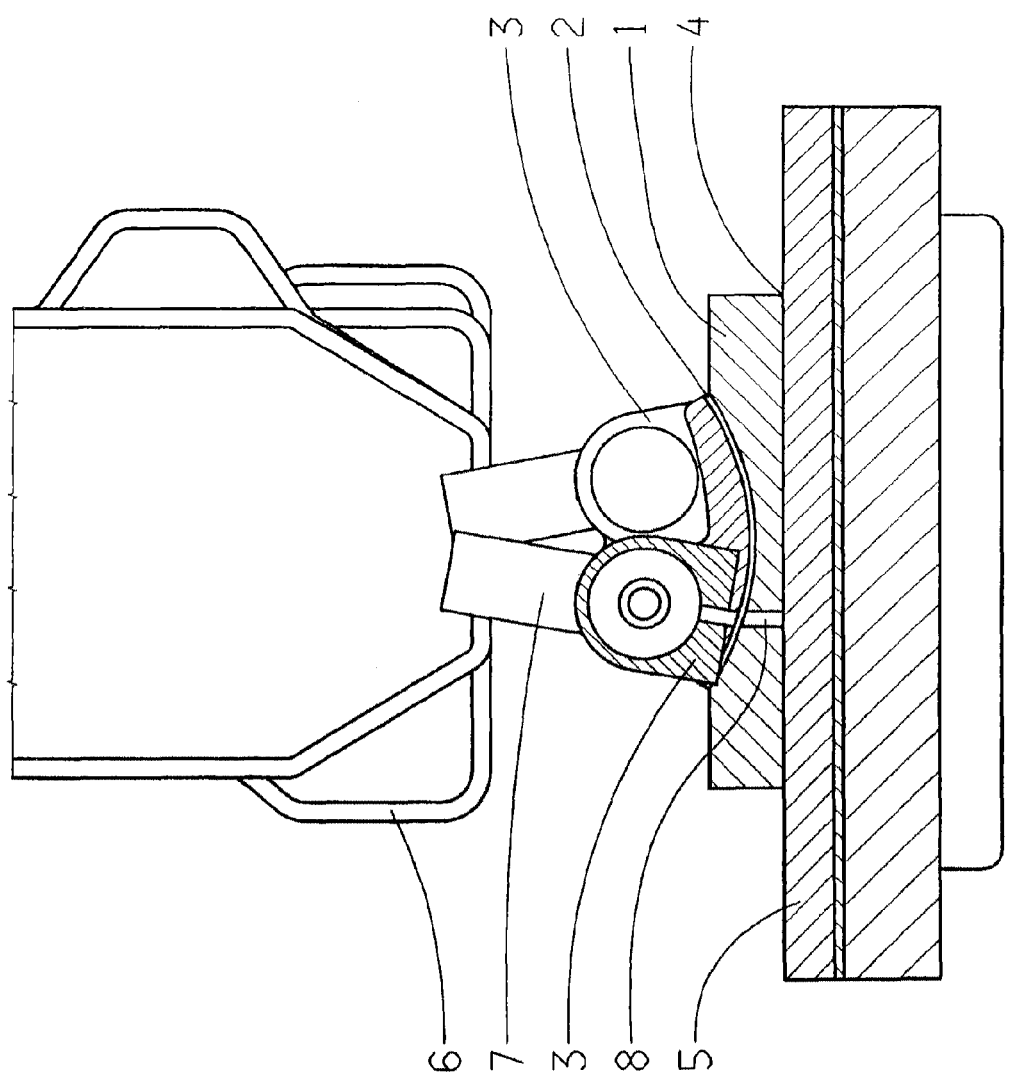

HYDRAULICALLY ACTUATED SHIFT ACTUATOR ASSEMBLY

This application is a national stage completion of PCT/EP2007/056541 filed Jun. 29, 2007 which claims priority from German application Serial No. DE 10 2006 031 265.1 filed Jul. 6, 2006.

FIELD OF THE INVENTION

The present invention concerns the arrangement of a hydraulically actuated shift actuator for a transmission.

BACKGROUND OF THE INVENTION

In transmissions whose shift cylinders, comprising shift actuators for carrying out shift operations, are actuated by a hydraulic control system, it can be the case that because of design considerations the actuators, i.e. the shift cylinders, cannot be integrated directly in the hydraulic control unit. In such a case it is advantageous if no other component is present between the housing in which the actuator is arranged and the hydraulic control unit, since tolerances are disadvantageously increased if a further component is present.

The hydraulic control unit must be fitted without leaks at the transfer points but since they should not be stressed due to the risk that sliding components may stick, the interface between the control unit and the actuator housing should be defined by a machined surface.

If there is any intermediate component between the control unit and the actuator housing, the interfaces must be sealed with elastic seals, this however increases costs and the elastic seals have the drawback of not being as reliable as direct-contact, planar sealing surfaces.

SUMMARY OF THE INVENTION

The purpose of the present invention is to provide an arrangement of a hydraulically actuated shift actuator located outside the hydraulic control unit comprising a shift cylinder, which ensures planar contact of the hydraulic control unit and correct force transfer into the housing and the shift cylinder of the actuator.

Accordingly, it is proposed to fix the shift cylinders or hydraulic cylinders of the shift actuator on a planar or circular machined area on the inside of a housing. According to the invention, the shift or hydraulic cylinder is fixed on this machined area and sealed either by pressure or by the application of a thin sealing compound. On the other side of the housing, namely the side facing away from the hydraulic cylinders, according to the invention there is a flat surface which serves for the hydraulically leak-proof fixing of the hydraulic control unit.

BRIEF DESCRIPTION OF THE INVENTION

Below, an example of the invention is explained in more detail with reference to the accompanying drawing in which the sole FIGURE shows a schematic sectioned view of the arrangement according to the invention.

DETAILED DESCRIPTION OF THE INVENTION

The FIGURE shows a housing 1 which, on the side facing the shift cylinders 3 of a shift actuator, has a circular machined area or recess 2, on which the shift cylinders 3 are fitted and sealed by pressure or by a sealing compound.

As can be seen from the FIGURE, the side of the housing 1 facing away from the shift cylinders 3 has a flat surface 4, on which the hydraulic control unit 5 is fixed in a leak-proof manner. The hydraulic fluid for actuating the shift cylinders 3 is delivered to them in each case, via a corresponding bore 8, through the housing 1. In the example shown, the two shift cylinders 3 illustrated actuate shift rockers 6 of the shift mechanism of the transmission via projecting levers 7.

Thanks to the design according to the invention, planar contact of the hydraulic control unit and force transfer into the housing and the shift cylinders of the actuator are ensured in a simple and inexpensive manner.

REFERENCE NUMERALS

1 Housing
2 Recess
3 Shift cylinders
4 Flat surface
5 Hydraulic control unit
6 Shift rocker
7 Lever
8 Bore

The invention claimed is:

1. A transmission with a housing (1), a hydraulic control unit (5) and a hydraulically actuated shift actuator comprising a shift cylinder (3), an inside of the housing is a circular machined area (2) on which the shift cylinder (3) of the shift actuator is fixed, and an other side of the housing facing away from the shift cylinder (3) is a flat surface on which the hydraulic control unit (5) is fixed in a hydraulically leak-proof manner.

2. The transmission according to claim 1, wherein the shift cylinder (3) is sealed by one of pressure or a sealing compound.

3. The transmission according to claim 1, wherein the housing (1) has a bore (8) through which hydraulic fluid for actuating the shift cylinder (3) is delivered to the shift cylinder.

4. A transmission shift actuator comprising a hydraulically actuated shift cylinder (3) connected to a shift rocker (6) via a projecting lever (7), the shift cylinder (3) is fixed on a machined arcuate interior surface (2) of a housing (1), the shift cylinder (3) and the arcuate interior surface (2) are sealed by pressure or a sealing agent, a planar exterior surface (4) of the housing (1), opposite the arcuate interior surface (2), is fixed to a hydraulic control unit (5) in a leak-proof manner, and the housing (1) has a bore (8) through which hydraulic fluid is delivered to the shift cylinder (3) to actuate the shift rocker (6).

* * * * *